United States Patent [19]

Mendler

[11] Patent Number: 4,564,113
[45] Date of Patent: Jan. 14, 1986

[54] INJECTION MOLDED PLASTIC CLOSURE

[75] Inventor: Leo R. Mendler, Chicago, Ill.

[73] Assignee: Continental White Cap, Inc., Northbrook, Ill.

[21] Appl. No.: 647,762

[22] Filed: Sep. 6, 1984

[51] Int. Cl.⁴ .................. B65D 41/34; B65D 41/48
[52] U.S. Cl. .................... 215/252; 215/321; 215/329
[58] Field of Search ............ 215/252, 258, 330, 337, 215/321, 329; 249/59, 52, 66 R, 67

[56] References Cited

U.S. PATENT DOCUMENTS

| | | | |
|---|---|---|---|
| 3,204,799 | 9/1965 | Hunter et al. | 215/321 X |
| 3,482,725 | 12/1969 | Exton | 215/337 |
| 3,696,957 | 10/1972 | Van Baarn | 215/321 X |
| 3,780,898 | 12/1973 | Menkel | 215/337 |
| 3,940,103 | 2/1976 | Hilaire | 249/59 X |

FOREIGN PATENT DOCUMENTS 55191 6/1982 European Pat. Off. .................. 252/

Primary Examiner—Donald F. Norton
Attorney, Agent, or Firm—Charles E. Brown

[57] ABSTRACT

This relates to the formation of a cylindrical portion of an injection molded plastic member having an internal thread, rib or bead. In order to facilitate stripping of the thread, rib or bead from an associated core, the cylindrical element has formed in its exterior surface in axial alignment with the thread, rib or bead a groove of the same configuration. Thus, when the member is stripped from a core, the thread, rib or bead may expand radially outwardly into the corresponding groove without a material radial deformation of the cylindrical element.

7 Claims, 5 Drawing Figures

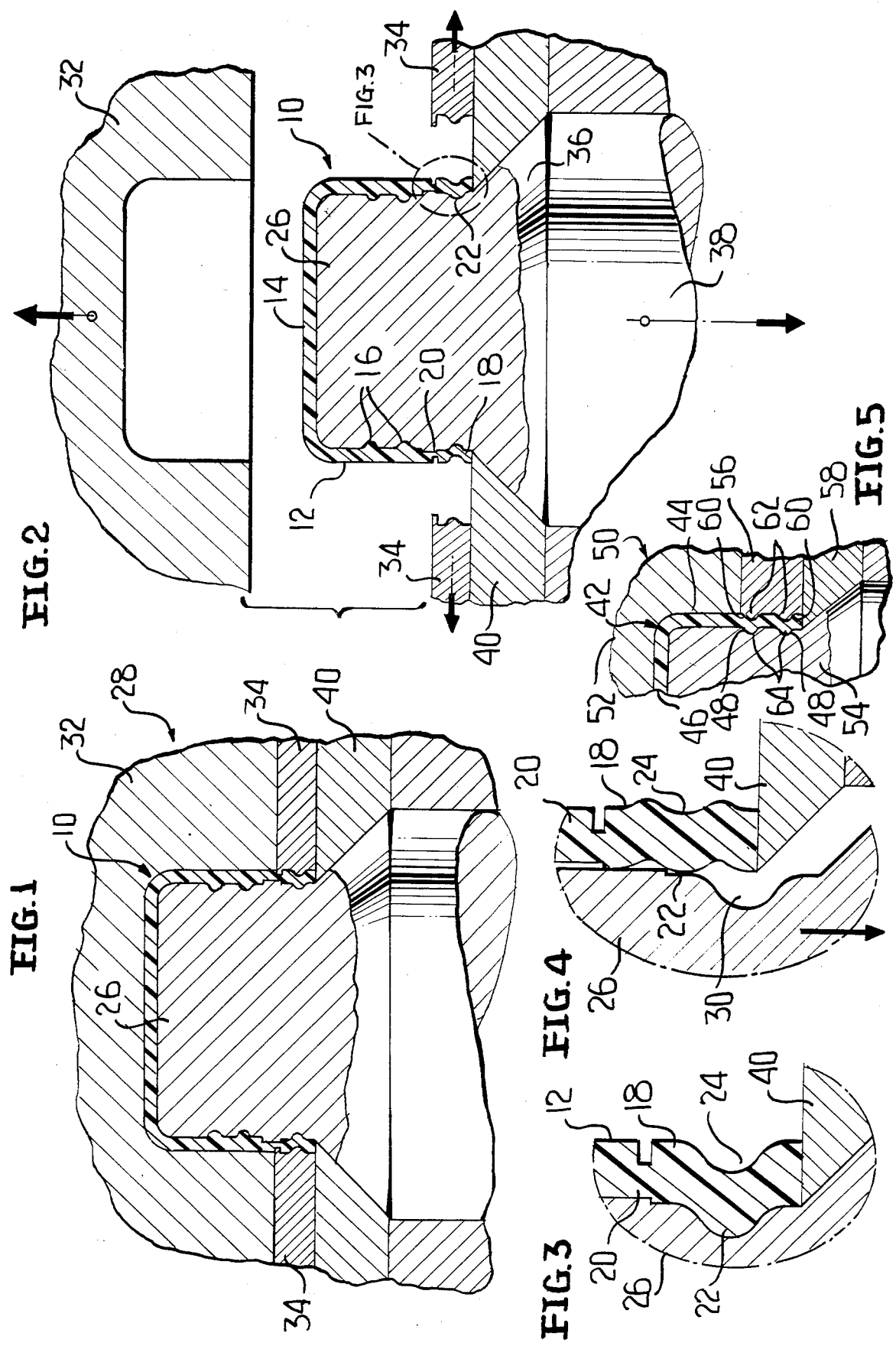

INJECTION MOLDED PLASTIC CLOSURE

This invention relates in general to the forming of closures having internal beads or threads, and in particular to the formation of a companion groove in the exterior of a closure in axial alignment with an internal bead or thread to facilitate stripping of the closure from a mold core.

In accordance with this invention, in order to permit the radially outward expansion of beads and threads relative to a mold core with a minimum deflection of the closure in the area of the beads or threads, the closure is provided in the exterior surface thereof with a groove which corresponds to the bead or thread and is axially aligned therewith so that during the stripping of the closure from the mold core the bead or thread may move radially outwardly generally in the space of the groove.

With the above and other objects in view that will hereinafter appear, the nature of the invention will be more clearly understood by reference to the following detailed description, the appended claims, and the several views illustrated in the accompanying drawings.

IN THE DRAWINGS:

FIG. 1 is a sectional view through a mold for forming a closure having a tamper indicating band and wherein the band has a radially inwardly directed bead for engagement beneath a retaining shoulder of a container neck finish.

FIG. 2 is a fragmentary sectional view similar to FIG. 1, and shows an exterior mold member axially displaced relative to the core and a radially split lower outer mold member opened wherein the closure is exteriorly free of the mold.

FIG. 3 is an enlarged fragmentary sectional view of the area designated by the legend "FIG. 3" in FIG. 2.

FIG. 4 is an enlarged sectional view similar to FIG. 3 and shows the closure being stripped from the core.

FIG. 5 is a fragmentary sectional view similar to FIG. 1, and shows a modified mold construction.

This invention particularly relates to the forming of a closure such as a closure 10 of the drawings. The closure 10 is of a conventional construction in general and includes a skirt 12 closed at one end by an integral end 14. The skirt 12 is provided with internal ribs or threads 16 for locking engagement with a container neck finish to hold the closure 12 on the container neck finish in sealed relation.

The illustrated closure 10 is provided with a tamper indicating band 18 which is connected to the skirt 12 at its lower edge along a line of weakening 20. The band 18 is provided with a radially inwardly directed bead 22 for engagement beneath a shoulder of a container neck finish in a manner wherein, when the closure 10 is removed, the band 18 will be separated from the remainder of the closure 10 along the line of weakening 20 and will remain in place on the container neck finish. In accordance with this invention, as is best shown in FIG. 3, the tamper indicating band 18 is modified from the customary construction by providing in the exterior surface thereof a groove 24 which is of a cross section generally corresponding to the cross section of the bead 22 and being in axial alignment therewith.

It will be seen that notwithstanding the fact that the tamper indicating band is provided with an internal bead or rib 22, the tamper indicating band 18 is of a substantially constant wall thickness. Thus, as is shown in FIG. 4, when the tamper indicating band 18 is being stripped from a mold core 26, which will be described in detail hereinafter, the cross section of the tamper indicating band 18 is modified due to deformation with the rib 22 moving outwardly and displacing adjacent material of the band 18 into the space of the groove 24.

The closure 10 is formed by injection molding of plastic material within a mold generally identified by the numeral 28. The mold 28 includes the above-mentioned core 26 which is of a configuration and extent to define the entire internal surface of the closure 10 including that of the tamper indicating band 18. To this end the lower part of the core 26 is provided in the lower part of the exterior surface thereof with a groove 30 which corresponds in cross section to the bead or rib 22 and which groove 30 defines the bead or rib 22 during the injection molding process.

That portion of the exterior surface of the closure 10 above the line of weakening 20 is defined by an exterior mold member 32 which is telescoped over the core 26.

The exterior surface of the tamper indicating band 18 and the line of weakening 20 is defined by a radially split lower outer mold member 34.

The core 26 is carried by a downwardly flaring upper portion 36 of a plunger 38. The portion 36 is surrounded by a stripper plate 40 which underlies the lower outer mold member 34 and closely surrounds the portion 36 to have a part thereof underlying and defining a lower edge of the tamper indicating band 18 as shown in FIGS. 1 and 2.

After the closure 10 has been injection molded, the mold member 32 is first moved upwardly as shown in FIG. 2. At the same time the split lower outer mold member 34 has the segments thereof slid transversely of the core 26. This leaves the exterior of the closure 10 fully free of any mold element with the closure 10 fully free of any mold element with the closure 10 now being ready to be stripped from the core 26. At this time the core 26 is moved downwardly in an axial direction opposite to that of the direction of movement of the core member 32 with the result that the stripper 40, which underlies the newly molded closure 10, serves to strip the closure 10 from the core 26 in the manner generally shown in FIG. 4. As previously described, when the tamper indicating band 18 is stripped from the core 26, the rib or bead 22 will move radially outwardly with the adjoining portion of the tamper indicating band 18 filling the space previously occupied by the groove 24 in the manner shown in FIG. 4, with there being a minimum of radial outward expansion of the band 18 during the stripping operation.

Although the invention as thus described relates solely to the facilitating of the stripping of the bead or rib 22 from the core 26, the invention is not so restricted. In FIG. 5 there is illustrated a closure 42 which does not have a tamper indicating band but wherein means are specifically provided for effecting the stripping of retaining beads or threads of the closure 42.

As shown in FIG. 5, the closure 42 includes a skirt 44 having one end closed by an end wall 46. The skirt 44 has projecting radially inwardly therefrom beads or threads 48.

The closure 42 is formed in an injection mold of the same type as the mold 28. This mold is generally identified by the numeral 50 and includes an upper exterior mold member 52 which telescopes over a core 54 and has associated therewith a radially split lower outer mold member 56. There is also a stripper plate 58.

It will be seen that the skirt 44 has formed in the exterior surface thereof grooves 60 which are axially aligned with and correspond to the beads or threads 48. The split lower outer mold member 56 is provided with ribs 62 which define the grooves 60 while the core 54 is provided with grooves 64 which define the beads or threads 48.

The operation of the mold 50 will be the same as that of the mold 28.

It is to be understood that this invention most particularly relates to the forming of a groove externally of a cylindrical wall axially aligned with and corresponding to an internal radially projecting rib, bead or thread whereby, when the rib, bead or thread is to be stripped from a core, the deflection of the cylindrical member will be primarily internally so as to facilitate stripping.

Although only several embodiments of the invention have been illustrated and described herein, it is to be understood that minor variations may be made in the article and the mold in which the article is injection molded without departing from the spirit and scope of the invention as defined by the appended claims.

I claim:

1. A molded plastic member, said plastic member being of the injection molded type and including a cylindrical portion having an internal projection of the type including threads, beads and ribs and being of the type formed by injection molding over a core, said member being improved by there being provided in the external surface of said cylindrical portion in radial alignment with said internal projection a groove generally of the size and shape of said internal projection whereby when said member is stripped from a core said internal projection may generally deform into said groove of said cylindrical portion and thus be readily stripped from a groove in the core in which said internal projection is formed.

2. An injection molded plastic member according to claim 1 wherein said cylindrical portion in the area of said internal projection is of a generally uniform thickness.

3. An injection molded plastic member according to claim 1 wherein said member in its as formed state is seated on a core about which said cylindrical portion is injection molded, and said core having a peripheral groove matching said internal projection in cross section with said internal projection being formed in said peripheral groove.

4. An injection molded plastic member according to claim 3 wherein said cylindrical portion is part of a closure for a container and said cylindrical portion includes a terminal tamper indicating band, and said internal projection is in the form a rib carried by said tamper indicating band.

5. An injection molded plastic closure according to claim 4 wherein said tamper indicating band is separated from the remainder of said cylindrical portion by a rupturable weakened area to effect detachment of said tamper indicating band from the remainder of said cylindrical portion when said closure is removed from an associated container neck finish, said groove in said external surface of said member being in said tamper indicating band, and in the as formed state of said member said tamper indicating band is seated in a radially split and radially displaceable injection mold unit having a rib seated in and defining said tamper indicting band groove.

6. An injection molded plastic closure according to claim 5 wherein said mold unit also has a portion projecting into said closure and defining said rupturable weakened area.

7. An injection molded plastic member according to claim 1 wherein said cylindrical portion is part of a closure for a container and said cylindrical portion includes a terminal tamper indicating band, and said internal projection is in the form of a rib carried by said tamper indicating band.

* * * * *